United States Patent [19]
Luteran

[11] 3,916,213
[45] Oct. 28, 1975

[54] LIQUID LEVEL CONTROLLER

[76] Inventor: Frank Kenneth Luteran, 10 Charles St., Auburn, N.Y. 13021

[22] Filed: Aug. 26, 1974

[21] Appl. No.: 500,317

[52] U.S. Cl............ 307/118; 73/304 C; 340/244 C; 137/392
[51] Int. Cl.² ......................................... G01F 23/00
[58] Field of Search....... 73/304 R, 304 C; 307/118; 137/392; 340/244 C

[56] References Cited
UNITED STATES PATENTS

| | | |
|---|---|---|
| 3,545,482 | 12/1970 | Paull .................................. 137/392 |
| 3,584,643 | 6/1971 | Burke.............................. 340/244 C |
| 3,771,548 | 11/1973 | Rauchwerger .................... 73/304 C |

Primary Examiner—Herman Hohauser

[57] ABSTRACT

A liquid level control system for sump pit and tank level control utilizing solid state sensing control of conductive liquids. A pair of electrodes are disposed in the liquid at the two levels at which level control is desired. The electrical circuitry generates a high frequency signal from the power line frequency and the attenuation of the high frequency signal by the conductive fluid acts to energize circuits to activate pumps and accessories.

11 Claims, 3 Drawing Figures

LIQUID LEVEL CONTROLLER

BACKGROUND OF THE INVENTION

In the area of liquid level sensing devices, mechanical or float systems are the most widely used. These devices when coupled with levers, relays and switches can be used to maintain the liquid in an enclosure between two preset limits. The reliability of these systems is limited and therefore have been replaced in some installations by electrical level sensing systems. Electrical systems of the current conductive type are similar to U.S. Pat. No. 3,787,733. These systems use the power line frequency as the signal that is conducted through a probe and the liquid to determine liquid level. These systems are susceptible to give false indications due to leakage currents from electrical equipment contacting the liquid and to 60 cycle hum pickup in the associated electrical wiring. These systems have also required relay switching of one of the probes to perform the two level control of the liquid. They also require an input transformer to provide the necessary power line isolation. Other electrical systems using DC current flow through the liquid have the shortcomings of producing electrolysis of the liquid and being susceptible to the effects of offset voltages created by component drift. There are no known systems that are completely electronic that can be used to maintain two level control of a conductive fluid with no danger of shock to operating personnel.

OBJECTS AND SUMMARY OF THE INVENTION

The present invention provides an improved liquid level control apparatus which obviates the previously described disadvantages of devices of the prior art.

It is a further object of the present invention to provide a liquid level control that does not require isolation from the power line.

Another object of the invention is to provide a level controller that contains no mechanical contacts and is therefore capable of being encapsulated to protect it from severe environments.

Yet another object of the invention is to provide a level controller that may be used to maintain either a full condition within certain level limits or an empty condition within certain limits by changing the location of the immersible probes.

A further object of the invention is to provide a low current liquid level controller that is intrinsically shockproof. Still a further object of the invention is to provide a level controller that utilizes a high frequency electrical signal to determine the level of conductive liquids.

The present invention performs the liquid level control function by utilizing the conductive property of a liquid to attenuate a high frequency signal when the probes are in contact with the liquid. The attenuation of the high frequency signals causes detector circuits to switch power to a pump or auxillary control circuit to cause liquid to be pumped into or out of the container to maintain the level limits set by the probe locations.

DESCRIPTION OF THE PREFERRED EMBODIMENT

Figure 1:
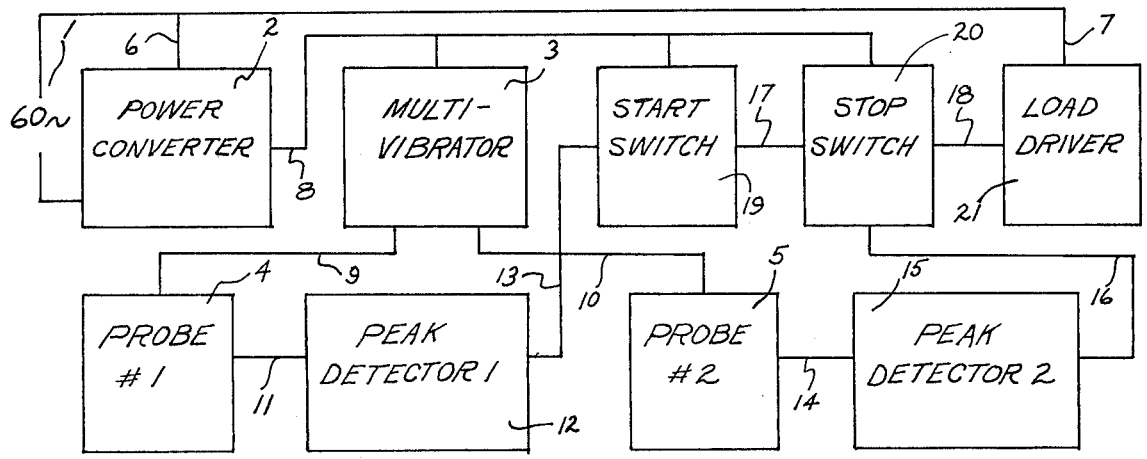
FIG. 1 is a block diagram showing the functional elements of the liquid level controller.

FIG. 1 shows the major circuit elements of the liquid level controller. Sixty cycle power 1 is supplied to power converter 2 through lead 6 where the AC power is converted by rectification to a DC voltage which is connected through lead 8 to multivibrator 3, start switch 19, and stop switch 20. Multivibrator 3 generates high frequency signals which are applied through lead 9 to No. 1 probe 4 and through lead 10 to No. 2 probe 5. The probes 4, 5, cause the high frequency signals to be attenuated when the probes are contacting a conductive fluid that is in contact with an electrically grounded surface. The signal from No. 1 probe 4 is connected by lead 11 to No. 1 peak detector 12. The signal from No. 2 probe 5 is connected by lead 14 to No. 2 peak detector 15. The peak detectors 12 and 15 rectify the high frequency signals and produce a D. C. signal equal to the peak value of the capacitively coupled high frequency signal from probes 4 and 5. The DC signal output of No. 1 peak detector 12 is connected through lead 13 to start switch 19. The DC signal output of No. 2 peak detector 15 is connected through lead 16 to stop switch 20. Start switch 19 and stop switch 20 form a logic network which translates the sequence of the probe states into commands to the driver. Start switch 19 is a latching switch that remains conducting when activated until stop switch 20 is deactivated. Start switch 19 can be made conductive only when stop switch 20 is activated. Stop switch 20 conducts when activated and is non-conductive when deactivated. Switches 19 and 20 are activated when probes 4 and 5 are not contacting the conductive fluid and are deactivated when the probes 4 and 5 are contacting the fluid. Start switch 19 is connected by lead 17 to stop switch 20. Switches 19 and 20 are connected in series by lead 18 to load driver 21. Load driver 21 is conductive only when both switches 19 and 20 are conductive, and is non-conductive when either switch is non-conductive. Load driver 21 is connected to additional control circuits or to a pump to change the level of the conductive fluid that probes 4 and 5 are disposed in.

Figure 2:
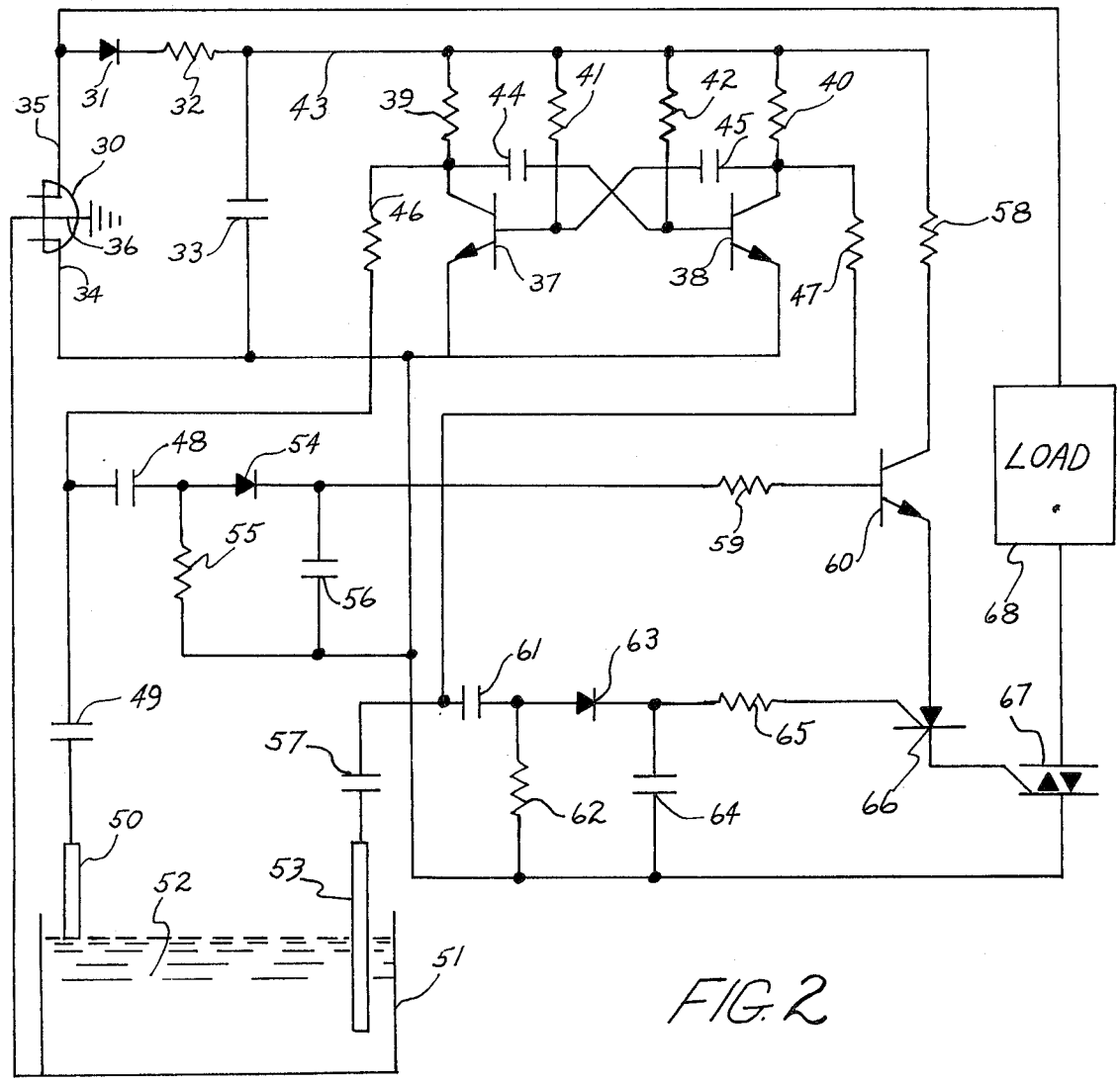
FIG. 2 is a schematic diagram of the electrical circuits connected to keep a tank filled between two levels.

In FIG. 2, AC power is supplied through plug 30. One side of the power line is connected to lead 35 and the other side is connected to lead 34. The neutral side of the power line may be connected to either lead 35 or lead 34. The power converter is comprised of 31, 32, and 33. The AC power input is half wave rectified by diode 31 to change capacitor 33 to a positive DC voltage. Resistor 32 reduces the voltage applied to the capacitor to provide a low positive DC voltage at lead 43. The DC voltage is applied to transistors 37, 38 and 60. Components 39, 37, 44, 41, 42, 45, 40, and 38 make up the multi-vibrator which supplies a first high frequency signal to probe 50 through capacitor 49 and resistor 46, and a second high frequency signal to probe 53 through capacitor 57 and resistor 47. Capacitors 49 and 57 are chosen to present a low impedance to the 60 cycle power frequency. Probes 50 and 53 are immersed in conductive fluid 52 in container 51. The inner surface of container 51 is conductively connected to ground lead 36. Resistor 46, capacitor 49, probe 50, fluid 52, container 51 and ground lead 36 provide a voltage divider network at the input of No. 1 peak detector comprised of 48, 55, 54, and 56. The high frequency signal applied to capacitor 48 is a maximum value when probe 50 is not contacting the fluid and is a minimum when probe 50 is contacting the fluid. In a similar manner resistor 47, capacitor 57, prober 53, conductive fluid 53 and container 51 form a probe divider network at the input to No. 2 peak detector comprised of 61, 62, 63, 64. The high frequency signal applied through capacitor 48 is rectified by diode 54 and charges capacitor 56 to the peak positive value of the high frequency input signal. The voltage on capacitor 56 is applied through resistor 59 to the base of transistor 60. Transistor 60 and resistor 59 comprise a stop switch. The DC voltage applied to the base of transistor 60 is insufficient to cause conduction when probe 50 is contacting fluid 52 and is sufficient to cause conduction of transistor 60 when probe 50 is not contacting fluid 52. In a similar manner voltage is developed by the peak detector comprised of 61, 62, 63, and 64. The positive voltage across capacitor 64 is applied through resistor 65 to the gate of SCR 66. The voltage applied to the gate of SCR 66 will be insufficient to cause conduction when probe 53 is contacting fluid 52 and sufficient to cause conduction when probe 53 is not contacting fluid 52. Resistor 65 and SCR 66 comprise a start switch. When transistor 60 and SCR 66 are both conducting, TRIAC 67 is turned on and the load is connected across the 60 cycle power input.

The operating sequence for maintaining the fluid level in container 51 by pumping more fluid into the container is as follows. When the level falls below probe 50 a maximum high frequency signal is applied to the peak detector and a sufficient voltage is applied to transistor 60 to cause conduction. Since SCR 66 is in the non-conducting state, no current flows into the gate of TRIAC 67 and the load which is a pump is not activated. When the fluid falls below the level of probe 53, sufficient voltage is applied to SCR 66 to cause conduction and to also cause TRIAC 67 to conduct and activate the pump load. As the fluid level rises in container 51, probe 53 contacts the fluid and a minimum high frequency signal is applied to the detector and an insufficient voltage is applied to the gate of SCR 66. However SCR remains conducting since it can be turned off only by turning off transistor 60. The fluid level continues to rise until probe 50 contacts the fluid and a minimum high frequency signal is applied to the peak detector and the voltage produced across capacitor 56 is insufficient to keep transistor 60 conducting. Transistor 60 stops conducting and causes SCR 66 and TRIAC 67 to stop conducting. The pump load is now deactivated. The cycle repeats and the fluid level is maintained between the levels determined by the probe positions.

Figure 3:
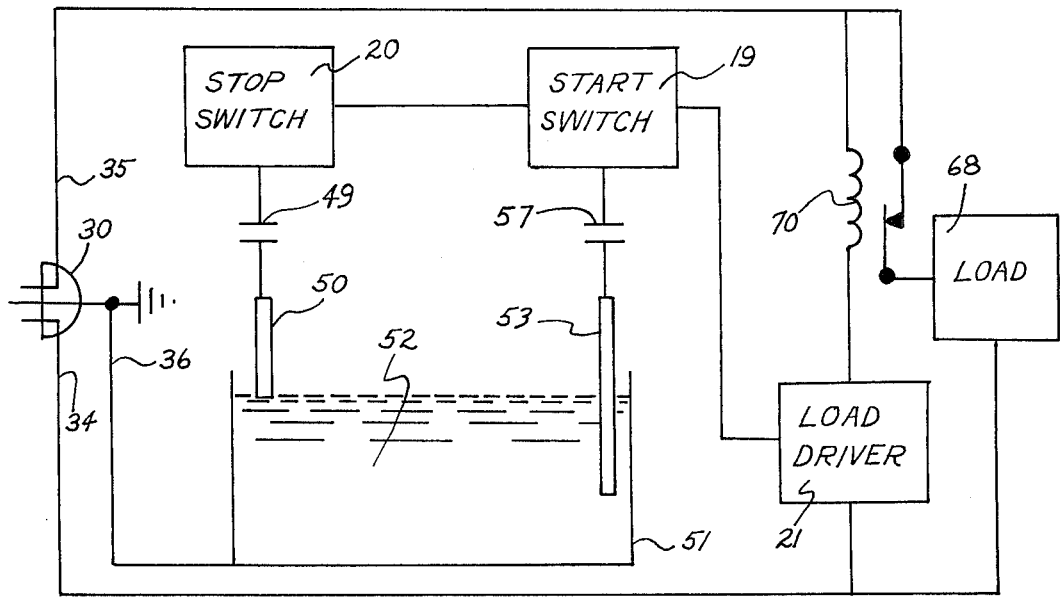
FIG. 3 is a partial schematic diagram of the electrical circuits connected to keep a sump emptied between two levels.

In FIG. 3 a simplified diagram is shown for maintaining the fluid between two levels by pumping fluid out of container 51. Relay 70 applies power to pump load 68 which operates to pump fluid out of the container. Stop switch 20 is activated when probe 50 is not contacting the fluid. Start switch 19 is activated when probe 53 is not contacting the fluid. Start switch 19 once activated cannot be deactivated until stop switch 20 is deactivated. When both stop switch 20 and start switch 19 are activated the load driver is activated and the pump load is deactivated through relay 70.

The operational sequence is the following. When the fluid raises and contacts both probes 50 and 53, start switch 20, stop switch 19 and load driver 21 are deactivated. Relay 70 contacts close and pump load 68 is activated and fluid is pumped out of container 51. As the fluid level lowers probe 50 causes stop switch 20 to conduct. Since start switch 19 is deactivated due to probe 53 contacting the fluid, load driver 21 remains nonconducting. When the fluid level falls below probe 53, start switch 19 is activated and load driver 21 becomes conducting and relay 70 is switched to deactivate pump load 68. As the fluid again rises probe 53 deactivates start switch 19; however, the start switch remains conducting since the SCR can only be turned off by deactivating stop switch 20. When the fluid level rises to contact probe 50, stop switch 20 becomes nonconducting, start switch 19 becomes nonconducting, and load driver 21 becomes nonconducting. Relay coil 70 is deactivated and power is applied to pump load 68 and water is pumped out of container 51. The cycle repeats and the fluid level is maintained between the levels determined by the probe positions.

The liquid level controller is intrinsically shockproof since the exposed probes are capacitively coupled to the electronics and present a high impedance to any 60 cycle leakage currents through the electronics. The controller will not cause electrolysis of the fluid since only alternating currents are passed through the fluid. It is also possible to operate the controller on DC voltages by eliminating the power converter and connecting the ground side of the DC voltage to the power line neutral lead.

I claim:
1. A system for controlling the level limits of a conductive fluid in an enclosure comprising:
   a. a first conductive probe disposed in the enclosure and contacting the fluid at the lower limit of the fluid level,
   b. a second conductive probe disposed in the enclosure and contacting the fluid at the upper limit of the fluid level,
   c. high frequency electrical means capacitively coupled to the first and second probes and producing a current flow through the probes, a maximum current flowing when the probes are in contact with the fluid and a minimum current flowing when the probes are in non-contact with the fluid,
   d. first detector means connected to the first probe and producing an output signal that is inversely related to the current flow through the first probe,
   e. second detector means connected to the second probe and producing an output signal that is inversely related to the current flow through the second probe,
   f. a start switch connected to the first detector output and activated when the first probe is in non-contact with the fluid, the start switch latching in the conductive state when activated,
   g. a stop switch connected to the second detector output and activated into conduction when the second probe is in non-contact with the fluid,
   h. DC voltage means supplying electrical energy to the high frequency electrical means, the start switch and the stop switch,
   i. driver means serially activated by the start and stop switches, and controlling pump means, the start and stop switches acting in conductive cooperation to activate the driver which controls the pump to maintain the fluid level within the limits determined by the location of the probes.

2. The combination of claim 1 wherein the high frequency electrical means includes a transistorized multivibrator and the DC voltage means includes a half wave rectifier circuit energized from the 60 cycle power input.

3. The combination of claim 1 wherein the first and second detector means include a diode rectifier and filter capacitor to produce a DC output signal equal to the peak value of the high frequency input signal.

4. The combination of claim 1 wherein the start switch includes an SCR serially connected between the stop switch and the input to the driver means.

5. The combination of claim 1 wherein the stop switch includes a transistor serially connected between the DC voltage means and the start switch.

6. The combination of claim 1 wherein the driver means includes a TRIAC activated by simultaneous conduction of the start and stop switches.

7. A system for controlling the level limits of a conductive liquid in an enclosure comprising:
  a. a first electrically conductive probe disposed in the enclosure at the lower level limit of the fluid,
  b. a second electrically conductive probe disposed in the enclosure at the upper level limit of the fluid,
  c. high frequency signal means connected to the probes and producing a current flow through the probes, the current decreasing when the probes are in non-contact with the fluid and increasing when the probes are in contact with the fluid,
  d. electrical conductive means connecting the fluid in the container to the power ground lead,
  e. DC energy means connected to the 60 cycle power and providing a DC voltage to the high frequency generating means,
  f. first detector means for measuring a change in current flow through the first probe,
  g. second detector means for measuring a change in current flow through the first probe,
  h. driver means having a control input and activating a pump for changing the liquid level in the enclosure,
  i. logic means activating the driver means when the detector means measure a decrease in probe currents and deactivating the driver means when the detector means measure an increase in probe currents.

8. The combination of claim 7 wherein the driver includes a TRIAC which is serially connected to the pump.

9. The combination of claim 7 wherein the logic means includes a stop switch which operates instantaneously with the change in current through the second probe and a start switch which latches in one state when the first probe current changes.

10. The combination of claim 9 wherein the stop switch is in a conductive state when the second probe is in non-contact with the fluid and is nonconductive when the second probe is in contact with the fluid and the start switch latches into a conductive state when the first probe changes from a contacting to a non-contacting state and the start switch is non-conductive when both probes are in the fluid contacting state.

11. The combination of claim 10 wherein the stop and start switches are serially connected to the control input of the driver means.

* * * * *